Patented Mar. 17, 1942

2,276,437

UNITED STATES PATENT OFFICE 2,276,437

POLYMERIC MATERIALS

Gordon T. Vaala, Wilmington, Del., assignor to E. I. du Pont de Nemours & Company, Wilmington, Del., a corporation of Delaware No Drawing. Application April 28, 1939, Serial No. 270,656

10 Claims. (Cl. 260—33)

This invention relates to synthetic linear polymers and more particularly to plasticized compositions comprising these polymers.

The polymeric materials used in the practice of this invention are the fiber-forming polymers known as synthetic linear superpolyamides and described in Patents 2,071,250, 2,071,253 and 2,130,948. It is therefore to be understood that the expression "synthetic linear polyamides," as used hereinafter and in the claims, designates the said general types. A characteristic property of these polymers is that they can be formed into filaments which can be cold drawn into fibers showing molecular orientation along the fiber axis. Of these polymers, the polyamides are most useful for the preparation of fibers, bristles, ribbons, sheets, rods, tubes, and the like. Polyamides are of two general types, those obtainable from polymerizable monoaminomonocarboxylic acids and their amide-forming derivatives, and those obtainable from the reaction of suitable diamines with suitable dicarboxylic acids or amide-forming derivatives of dibasic carboxylic acids. On hydrolysis with mineral acids, the polyamides revert to monomeric amide-forming reactants. For example, a polyamide derived from a diamine and a dibasic acid yields on hydrolysis with hydrochloric acid the dibasic acid and the diamine hydrochloride.

Although the synthetic linear superpolyamides as a class are microcrystalline and have fairly high and sharp melting points, they can be formed into many useful objects without the use of solvents or plasticizers. This is accomplished by spinning, extruding, or otherwise forming the object from the molten polyamides. To improve the properties of the products thus formed, it is generally desirable to subject them to a process of cold drawing (application of tensile stress) or to a process of cold working, e. g. cold rolling (application of compressive stress) or by subjecting them to both cold drawing and cold working. The products thus formed are unusually strong, have high melting points, and for many purposes are sufficiently pliable. For certain uses, however, and particularly for use in the form of films, sheets and the like, greater pliability is sometimes desired. While plasticizers or other modifying agents heretofore discovered have had their utility in improving the properties of polyamides, the increasing use to which polyamides have been put and the increasing number of desirable properties required of polyamides for most purposes have made the discovery of new and economical plasticizers a matter of considerable importance to the art.

This invention has as an object the preparation of new compositions useful in making filaments, bristles, ribbons, films, sheets, rods, tubes, etc. Another object is to improve the properties, particularly the pliability, of synthetic linear superpolyamides and of articles derived therefrom.

These and other objects, which will become apparent from the following description, are accomplished by incorporating in the polyamide certain C-alkyl aromatic sulfonamides, referred to herein as alkylaryl sulfonamides.

Although a wide variety of sulfonamides are used to some extent as plasticizers for the above mentioned polyamides, I have found that certain of the sulfonamides exhibit in the polyamide composition a utility which is not obtainable by the sulfonamides in general and which confers to the compositions new uses and a wider application in industry than is otherwise obtainable. I have further discovered that the sulfonamides having the mentioned superior utility for the present purpose are the alkylaryl sulfonamides of the formula $R-R_1-SO_2NR_2R_3$, in which R is an alkyl radical of at least 4 carbon atoms, $R_1$ is an aromatic radical which may contain alkyl substituents, and $R_2$ and $R_3$ are hydrogen or organic radicals, but are preferably hydrogen. As previously indicated, these sulfonamides as plasticizers for polyamides impart greater pliability and elasticity than is obtained by other sulfonamides, as for instance by those containing only nitrogen substituted alkyl radicals, or by those in which the aromatic radical has no substituent or an alkyl substituent having less than 4 carbons, for example toluene sulfonamides and benzene sulfonamides. Other important advantages of sulfonamides having the structure indicated in the formula over the lower alkyl substituted arylsulfonamides are lower volatility and lower solubility, particularly in water. The benzene- and toluenesulfonamides, whether or not they have substituents on the amide nitrogen, have certain undesirable properties for use as plasticizers. In the absence of substituents on the nitrogen, these products are high melting, comparatively low boiling solids. Solids in general are poorer plasticizers than liquids, since they have a tendency to "bloom" on the surface of the plasticized product. When alkyl groups are substituted on the amide nitrogen, the resulting benzene- and toluenesulfonamides are lower melting, but their compatibility with polyamides is greatly reduced.

The alkylaryl sulfonamides used in the practice of this invention are in general low melting solids or viscous liquids having high boiling points. For most purposes it is preferable to use an alkylaryl sulfonamide in which the aryl nucleus is benzene and the alkyl substituent attached to the benzene ring contains from 4 to 10 carbon atoms. The alkylaryl sulfonamide may also be substituted on the amide nitrogen with one or two substituents, these substituents being either aliphatic, alicyclic, or aromatic radicals. Particularly valuable sulfonamides are those of the formula

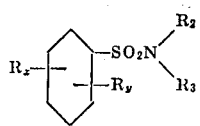

wherein $R_x$ and $R_y$ are monovalent aliphatic radicals containing from 4 to 10 carbon atoms, $R_2$ and $R_3$ are hydrogen or an organic radical, such as an aliphatic radical containing from 4 to 10 carbon atoms, or alicyclic rings containing 5 or 6 carbon atoms, or an aromatic radical such as benzene. $R_2$ and $R_3$ may or may not be identical. Preferably $R_2$ and $R_3$ are hydrogen. Likewise $R_x$ and $R_y$ may be alike or different and may be substituted on any of the carbons in the benzene ring.

The following table shows the marked advantages of the sulfonamide plasticizers of this invention over toluene sulfonamide, a typical aryl sulfonamide plasticizer having a short chain alkyl substituent. The polamide used in the tests was an interpolyamide derived from hexamethylenediamine, adipic acid, and 6-aminocaproic acid. The amount of plasticizer used was equal in weight to the amount of polyamide.

| Plasticizer | Pliability* | | Volatility, change in wt. after 116 hrs. at 65° C. | Water resistance, wt. loss on 65 hrs. water leaching |
| --- | --- | --- | --- | --- |
| | Original | After 1 wk. at 65° C. | | |
| | | | | Percent |
| Amylbenzenesulfonamide | 243 | 307 | Slight gain | 30 |
| Diamylbenzenesulfonamide | 177 | 202 | ___do___ | 2.5 |
| Toluenesulfonamide (N-ethyl-derivative) | 101 | 67 | 23% loss | 46 |

*Pliability express as $10^{-6} \times \frac{1}{\text{modulus of elasticity}}$.

For most purposes the quantities of the sulfonamide ranging from 10 to 150% by weight of the polyamide are used to greatest advantage, the amount used depending on the nature of the alkylaryl sulfonamide used, and the properties desired in the final product. Other amounts of plasticizer may be used, however, in certain applications. The addition of the sulfonamide causes a lowering in the melting point of the product and in the case of interpolyamides, causes them to soften over a wider range. This lowering of the melting point is desirable since it reduces the tendency for the molten polymer to discolor and degenerate when exposed to air. Furthermore, it permits molding and forming operations to be carried out at lower temperatures, thereby reducing the operating cost. When large amounts of the sulfonamide are used with interpolymers a high degree of pliability and rubberiness are developed. This elasticity is further developed when such compositions are cold worked, e. g. cold rolled. In the simple high melting polyamides the use of moderate amounts of the sulfonamide does not in any way interfere with the process of cold drawing or cold working; it actually improves the cold rolling qualities of the product.

A very convenient method for incorporating the sulfonamide in the polyamide consists in immersing the polyamide in sheet form in a solution of the sulfonamide in a nonsolvent for the polyamide. Concentrated or saturated solutions of the sulfonamide in aqueous alcohol are especially useful. Under these conditions the sulfonamide is absorbed by the polyamide sheet. In many instances selective absorption occurs as evidenced by the fact that the concentration of the sulfonamide within the polyamide can be made to exceed that within the solution. After the desired amount of sulfonamide has been absorbed by the polyamide, the sheet is removed and dried. The plasticizing effect of the sulfonamide is enhanced by the presence within the polyamide sheet of a small amount of alcohol or water. The amount of water which the polyamide sheet absorbs from the air under ordinary conditions of humidity is usually sufficient for this purpose.

Other methods of incorporating the sulfonamide can also be used. For example, the polyamide and sulfonamide can be dissolved in a mutual solvent and the solution used in making filaments, films, rods, and the like, either by evaporative or coagulative methods. The lower fatty acids, e. g. formic acid, are useful solvents for this purpose. Phenols can also be used to advantage. Mixtures of chloroform and methanol are especially useful solvents for the interpolymers. The sulfonamides often increase the solubility of polyamides in a given solvent, thus permitting the preparation of solutions of high solids content, as are desirable for many purposes, such as for casting thick films. The sulfonamides of this invention may be incorporated by direct blending with the molten polymer.

A further method for incorporating the sulfonamide with polyamide consists in including the sulfonamide with the monomeric polyamide-forming reactants before polymerization.

This invention is described more specifically in the following examples in which the parts are by weight.

*Example I*

A polyamide interpolymer was prepared by heating 450 parts of hexamethylenediammonium adipate, 300 parts of caprolactam, and 50 parts of water for one hour at 265°–270° C. under the generated pressure (300 lbs./sq. in.). The water was bled off and heating continued for three hours under reduced pressure (100 mm.). The molten polymer was then extruded in ribbon form. It had an intrinsic viscosity of 1.06 and melted at 174°–177° C.

Fifteen (15) parts of this interpolymer, and 15 parts of amylbenzenesulfonamide were dissolved in a mixture of 40 parts of chloroform and 40 parts of methanol by stirring at 60° C. for two hours. The solution was cooled to room temperature and a portion poured onto a glass plate at the same temperature. By means of a leveling blade the solution was spread to an even layer and the solvent allowed to evaporate in the open air. The final traces of solvent were removed from the film by aging at 75° C. for two hours. The film after removal from the glass plate by soaking in water was soft and pliable and had a marked elasticity. It melted at 107°–115° C. when tested on a copper block in the open. When tested on the standard Olsen tensile strength machine it showed an elongation of 400% and tensile values of 1970 and 4800 lbs. per square inch on the original and break dimensions, respectively. The film had a yield point (i. e. the point, during the application of tensile stress, where true elongation begins) of 430 lbs. per square inch as compared to about 3300 lbs. per square inch for the unmodified polymer.

*Example II*

A polyamide interpolymer was prepared by heating equal molecular weights of hexamethylenediammonium adipate and decamethylenediammonium sebacate at 230°–250° C. under conditions which permitted the removal of the water formed during the reaction. The polymer had an intrinsic viscosity of 1.0. Fifteen (15) parts of this polyamide and 10 parts of amylbenzenesulfonamide were dissolved in 40 parts of a mixture of equal parts of chloroform and methanol by heating at 60° C. for two hours. The solution was cooled to about 20° C. and a portion poured onto a clean glass plate also cooled to about 20° C. By means of a leveling blade the solution was spread to an even layer and the solvent evaporated from the film at room temperature. The final traces of solvent were removed by baking the film on the glass plate for two hours at 75° C., and the film removed from the plate by soaking in water. The film thus prepared was pliable and clear and softened at 104° to 109° C. when tested on a copper block in the open air. When tested on the Standard Olsen Tensile Strength Machine it showed an elongation of 400% and tensile values of 1430 and 2700 lbs. per square inch on original and break dimensions, respectively.

*Example III*

Fifteen (15) parts of a polyhexamethylene adipamidecaprolactam interpolymer (prepared as in Example I), 6 parts of amylbenzenesulfonamide, and 9 parts of N-ethyl amylbenzenesulfonamide were dissolved in 50 parts of a mixture of equal parts of chloroform and methanol by heating at 60° C. for two hours. A film was prepared from this composition by casting onto a plate as described in Example I. The film, after removal from the glass plate by soaking in water, was soft and pliable and remarkably clear. It melted at 126°–133° C. when tested on a copper block in the open, and had tensile values of 1770 and 5000 lbs. per square inch calculated on the original and break dimensions, respectively.

*Example IV*

Ten (10) parts of polyhexamethylene sebacamide and 2.5 parts of hexylbenzenesulfonamide were heated for 0.5 hour at 235°–255° C. with stirring. A slow stream of carbon dioxide was passed over the surface of the product during the entire heating period, to exclude air and minimize discoloration. A viscous, clear, homogeneous melt resulted. After cooling, the plasticized polyamide melted at 188°–194° C. when tested on a copper block in the open. A portion was molded between aluminum plates at 210° C. to a clear transparent flexible film which was softer than the unmodified polyamide.

*Example V*

Ten (10) parts of a polymer prepared from caprolactam, were fused at 210°–220° C. in an atmosphere of carbon dioxide to form a viscous melt. To this melt was added with stirring 10 parts of amylbenzenesulfonamide. The materials blended to yield a homogeneous melt of medium viscosity, which upon cooling set to a tough solid melting at 149°–156° C. The composition was molded at 185° C. to a clear pliable film having tensile values of 1070 and 2000 lbs. per square inch calculated on original and break dimensions, respectively.

*Example VI*

A ribbon of polyhexamethylene adipamide was immersed in a solution containing 30 parts of amylbenzenesulfonamide, 170 parts of ethyl alcohol and 390 parts of water (this is a substantially saturated solution and contains 5% amylbenzenesulfonamide by weight) maintained at 75°–80° C. After three hours the strip was removed from the solution, rinsed with 95% alcohol, and dried to constant weight at 75° C. The sample, which showed an increase in weight of 14.9%, was more pliable than the original. When allowed to remain in air for several hours, the sample absorbed approximately 2% of its weight of moisture. The ribbon containing the sulfonamide and the water was more pliable than either the unplasticized ribbon or the ribbon containing only the sulfonamide. The tensile strength of the plasticized sample after standing for 48 hours at 50% relative humidity and 25° C. was 8600 lbs. per square inch as compared to 12,500 lbs. per square inch for the original ribbon.

*Example VII*

Ten (10) parts of a hexamethylene adipamidecaprolactam interpolymer (prepared as in Example I) and 10 parts of diamylbenzene sulfonamide were dissolved in a mixture of equal parts of chloroform and methanol by stirring for two hours at 60° C. A film was prepared by the method described in Example I. This film was very pliable and elastic and had a high gloss. It melted at 140°–145° C. when tested on a copper block in the open and had tensile values of 2300 and 6000 lbs. per square inch calculated on original and break dimensions, respectively. It had an elongation of 400%, and a yield point of 690 lbs. per square inch.

It is to be understood that the aforementioned examples are merely illustrative of the compositions of this invention and their manner of preparation. As examples of additional synthetic linear superpolyamides which can be plasticized by the addition of alkylaryl sulfonamides, there may be mentioned polytetramethylene sebacamide, polypentamethylene adipamide, polypentamethylene sebacamide, polyhexamethylene suberamide, polyhexamethylene sebacamide, polyoctamethylene adipamide, polydecamethylene carbamide, poly-p-xylylene sebacamide, polydecamethylene phenylene diacetamide, and the polyamide derived from 3.3′-diaminodipropyl ether and adipic acid. Polymerized amino acids and their lactams, as for instance, polymerized 6-aminocaproic acid, polymerized 9-aminononanoic acid, and polymerized 11-aminoundecanoic acid are additional examples of linear superpolymers which may be used. Obviously, the invention is also applicable to mixtures of polyamides. In general, the synthetic linear polymers do not possess fiber-forming properties unless they have an intrinsic viscosity above 0.4. Likewise, to be useful in making films, ribbons, tubes, rods, etc., the polyamide should have an intrinsic viscosity above 0.4 and preferably above 0.6. The expression, intrinsic viscosity, is to be understood in accordance with the definition thereof contained in Carothers U. S. Patent 2,130,948.

Instead of the polyamides mentioned above which are obtainable from bifunctional polyamide-forming reactants, as essentially sole reactants, I may use the linear superpolymers obtained by including with the polyamide-forming reactants used to prepare the polyamide other bifunctional reactants such as glycols and hydroxy acids. As examples of such modified polyamides may be mentioned those derived from diamines, dibasic acids and glycols; those derived from amino acids, dibasic acids and glycols; and those derived from amino acids and hydroxy acids. Although these products contain ester linkages, they can be referred to as polyamides, since they contain a plurality of amide linkages and retain many of the desirable properties of the simple polyamides. Like the simple polyamides these modified polyamides do not in general exhibit fiber-forming properties until their intrinsic viscosity is at least 0.4.

As additional examples of alkylaryl sulfonamides which may be used in making the compositions of this invention may be mentioned the following: butylbenzenesulfonamide, N-ethyl butyl-benzenesulfonamide, N-diethyl butylbenzenesulfonamide, N-amyl butylbenzenesulfonamide, N-methyl amylbenzenesulfonamide, N-isobutyl amylbenzenesulfonamide, N-cyclohexyl amylbenzenesulfonamide, N-ethyl hexylbenzenesulfonamide, N-dibutyl hexylbenzenesulfonamide, octylbenzenesulfonamide, decylbenzenesulfonamide, N-methyl decylbenzenesulfonamide, cyclohexylbenzenesulfonamide, crotylbenzenesulfonamide, laurylbenzenesulfonamide, and octadecylbenzenesulfonamide. Arkylaryl sulfonamides derived from polyalkylbenzenes may also be used. Polyalkylaryl benzenesulfonamides of this type include: N-ethyl diamylbenzenesulfonamide, N-diethyl diamylbenzenesulfonamide, triamylbenzenesulfonamide, dihexylbenzenesulfonamide, trihexylbenzenesulfonamide, dioctylbenzenesulfonamide, and didecylbenzenesulfonamide. Mixtures of alkylaryl sulfonamides may be used, mixtures of amylbenzenesulfonamide and diamylbenzenesulfonamide being particularly valuable.

Alkylaryl sulfonamides are conveniently prepared from the alkyl benzene by first preparing the alkylbenzene sulfonyl chloride through the action of chlorosulfonic acid on the hydrocarbon, followed by conversion to the amide by treatment with ammonia or the appropriate amine. For example, amylbenzenesulfonamide is prepared from amylbenzene by reacting 1 equivalent of this hydrocarbon with about 2.5 equivalents of chlorosulfonic acid at 5°–10° C. The amylbenzenesulfonyl chloride is separated from the reaction mixture by decantation and washed free from chlorosulfonic acid. Upon treatment with an excess of aqueous ammonium hydroxide the amylbenzenesulfonyl chloride is converted into amylbenzenesulfonamide. By substituting an amine (e. g. ethylamine) for the ammonium hydroxide in the last step of the preparation, an N-substituted amylbenzenesulfonamide is obtained (e. g. N-ethyl amylbenzenesulfonamide).

As already indicated, the plasticizing effect of the sulfonamide is greatly increased by the presence of a small amount of water. Other hydroxylated nonsolvents, particularly alcohols such as methanol, propanol, isobutanol, benzyl alcohol, cyclohexanol, hexamethylene glycol, and glycerol, have a similar effect. Moreover, there may be associated with the polyamide-alkylaryl sulfonate compositions other types of plasticizers, e. g. dibutyl phthalate, tricresyl phosphate, dibutyl sebacate, dibutyl adipate, dibutyl maleate, salicylic acid, lactic acid, camphor, and sulfonamide-formaldehyde resins. Particularly valuable products are obtained by using the plasticizer of this invention in conjunction with with phenols, e. g. t-butylphenol, amylphenol, diamylphenol, resorcinol, carvacrol, 2-(bis-4-hydroxyphenol)-propane, and p-hydroxy-diphenyl. The compositions of this invention may also contain other types of modifying agents, e. g. luster modifying agents, pigments, dyes, antioxidants, oils, antiseptics, cellulose derivatives, and ultraviolet light opacifying agents, e. g. benzyl salicylate and methyl Carbitol salicylate, which retard the darkening of the compositions on exposure to light.

The polyamide-alkylarylsulfonamide compositions of this invention are useful in many forms and for many purposes. Typical applications are yarns, fabrics, bristles, surgical sutures, fishing leaders, fishline, dental floss, rods, tubes, films, ribbons, sheets, safety glass interlayers, molded articles, adhesives, electrical insulation (e. g., for wires), impregnating agents, and coating compositions. They are useful for impregnating cloth followed by calendering or pressing for use as collar interliners. The greater pliability obtained through the agents described herein is particularly important when the polyamide is in sheet form. Typical uses for the material in this form are wrapping foils, leather applications, rain coats, shower curtains, and umbrellas. By reason of the fact that superpolyamide-alkylarylsulfonamide compositions may be melted and thus extruded, they can be formed into tubing, and coated directly onto fabric and metals. The compositions are also useful in the preparation of blown articles such as toys, hollow toilet ware, etc. Furthermore they can be compression molded, i. e. blanked or stamped out into shaped articles.

As many apparently widely different embodiments of this invention may be made without departing from the spirit and scope thereof, it is to be understood that I do not limit myself to the specific embodiments thereof except as defined in the appended claims.

I claim:

1. The plasticized polyamide set forth in claim 3 in which said sulfonamide is amylbenzenesulfonamide.

2. The plasticized polyamide set forth in claim 3 in which said sulfonamide is diamylbenzenesulfonamide.

3. A synthetic linear polyamide plasticized with an alkylaryl sulfonamide in which the alkyl group contains at least four carbon atoms, the said polyamide being the reaction product of a polymer-forming composition comprising reacting materials selected from the class consisting of (a) polymerizable monoaminomonocarboxylic acids, and (b) mixtures of diamine and dibasic carboxylic acid; the said polyamide having an intrinsic viscosity of at least 0.4.

4. A synthetic linear polyamide plasticized with an alkylaryl sulfonamide in which the alkyl group contains at least four carbon atoms, the said polyamide being the reaction product of a polymer-forming composition comprising reacting product of a polymer-forming composition comprising reacting materials selected from the class consisting of (a) polymerizable monoaminomonocarboxylic acids, and (b) mixtures of diamine and dibasic carboxylic acid; the said polyamide being one which can be formed into fibers showing by characteristic X-ray patterns orientation along the fiber axis.

5. The plasticized synthetic linear polyamide set forth in claim 3 in which the said sulfonamide is of the formula

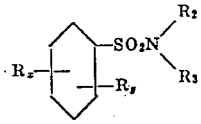

where $R_x$ and $R_y$ are monovalent aliphatic radicals containing from 4 to 10 carbon atoms, and $R_2$ and $R_3$ are members of the class consisting of hydrogen and a hydrocarbon radical.

6. A synthetic linear polyamide plasticized with an alkylaryl sulfonamide in which the alkyl group contains at least four carbon atoms, the said polyamide being the reaction product of a polymer-forming composition comprising a polymerizable monoaminomonocarboxylic acid and having an intrinsic viscosity of at least 0.4.

7. A synthetic linear polyamide plasticized with an alkylaryl sulfonamide in which the alkyl group contains at least four carbon atoms, the said polyamide being the reaction product of a polymer-forming composition comprising a mixture of diamine and dibasic carboxylic acid, and having an intrinsic viscosity of at least 0.4.

8. The plasticized synthetic linear polyamide set forth in claim 3 in which the said sulfonamide is N-ethyl-amylbenzene sulfonamide.

9. A synthetic linear polyamide plasticized with a mixture comprising a hydroxylated non-solvent for the polyamide and an alkylaryl sulfonamide in which the alkyl group contains at least four carbon atoms, the said polyamide being the reaction product of a polymer-forming composition comprising reacting materials selected from the class consisting of (a) polymerizable monoaminomonocarboxylic acids, and (b) mixtures of diamine and dibasic carboxylic acid; the said polyamide having an intrinsic viscosity of at least 0.4.

10. The plasticized synthetic linear polyamide set forth in claim 9 wherein the said hydroxylated nonsolvent is water.

GORDON T. VAALA.

CERTIFICATE OF CORRECTION.

Patent No. 2,276,437. March 17, 1942.

GORDON T. VAALA.

It is hereby certified that error appears in the printed specification of the above numbered patent requiring correction as follows: Page 4, first column, line 39, for "Arkylaryl" read --Alkylaryl--; and second column, line 3, for "sulfonate" read --sulfonamide--; line 74, claim 4, strike out "product of a polymer-forming composition comprising reacting"; and that the said Letters Patent should be read with this correction therein that the same may conform to the record of the case in the Patent Office.

Signed and sealed this 26th day of May, A. D. 1942.

(Seal)

Henry Van Arsdale,
Acting Commissioner of Patents.